United States Patent [19]
Arima et al.

[11] Patent Number: 5,381,262
[45] Date of Patent: Jan. 10, 1995

[54] PLANAR WAVE GUIDE TYPE OPTICAL AMPLIFIER

[75] Inventors: Tadao Arima; Koji Okamura, both of Kawasaki, Japan

[73] Assignee: Fujitsu Limited, Kawasaki, Japan

[21] Appl. No.: 104,662

[22] Filed: Aug. 11, 1993

[30] Foreign Application Priority Data

Aug. 18, 1992 [JP] Japan ................... 4-219027

[51] Int. Cl.⁶ .............................. G02B 6/26
[52] U.S. Cl. ...................... 359/341; 359/343
[58] Field of Search ................ 359/341–343; 385/1, 141

[56] References Cited

U.S. PATENT DOCUMENTS

| | | | |
|---|---|---|---|
| 5,128,801 | 7/1992 | Jansen et al. | 359/343 |
| 5,155,621 | 10/1992 | Takeda et al. | 359/341 X |
| 5,185,847 | 2/1993 | Fevrier et al. | 359/343 X |
| 5,227,913 | 7/1993 | McCaughan et al. | 359/341 |
| 5,274,734 | 12/1993 | Jin et al. | 359/341 X |

*Primary Examiner*—Mark Hellner
*Attorney, Agent, or Firm*—Staas & Halsey

[57] ABSTRACT

Disclosed are a planar wave guide type optical amplifier for amplifying a light signal passing through an optical fiber, a method of manufacturing the above light amplifier, and a laser oscillator using the light amplifier, The planar wave guide type optical amplifier comprises a first core formed to a bar shaped on a substrate and a light amplifying region composed of a part of the first core, having a configuration extending to the longitudinal direction of the first core, and doped with a rare earth element. The method of manufacturing the planar wave guide type optical amplifier comprises the steps of (1) forming a bar-shaped core on a plane substrate, (2) forming a groove to the core which extends to the longitudinal direction thereof, (3) filling the groove with a filler doped with a rare earth element and (4) solidifying the filler. The laser oscillator comprises a first core formed to a bar shape on a substrate, a light amplifying region composed of a part of the first core, having a configuration extending to the longitudinal direction of the first core, and doped with a rare earth element, and light reflecting means provided with the opposite ends of the first core, respectively,

11 Claims, 4 Drawing Sheets

PLANAR WAVE GUIDE TYPE OPTICAL AMPLIFIER

BACKGROUND OF THE INVENTION

(1) Field of the Invention

The present invention relates to a planar wave guide type optical amplifier for amplifying a light signal passing through an optical fiber, a method of manufacturing the planar wave guide type optical amplifier, and a laser oscillator using the planar wave guide type optical amplifier, and more specifically, to a planar wave guide type optical amplifier to which a rare earth element is doped and a method of manufacturing the same and a device using the same.

(2) Description of the Related Art

In general, a fiber type light amplifier including an optical fiber having a core doped with a rare earth element such as erbium (Er) or the like is used as a light amplifier used in an optical communication system.

FIG. 1 is a diagram showing the arrangement of a fiber type light amplifier. A signal light with a wavelength of 1.53 μm passing through an optical fiber 31 is input to a wave synthesizer 32. The wave synthesizer 32 synthesizes a pumping light with a wavelength of 1.48 μm supplied from a pumping light output unit 33 and the signal light and supplies the same to an Er-doped optical fiber 34. The Er-doped optical fiber 34 absorbs the pumping light and amplifies the signal light. A wave separator 35 separates the amplified signal light from the pumping light which has not been absorbed by the Er-doped light fiber 34 and outputs only the signal light to an optical fiber 36.

Nevertheless, this fiber type light amplifier has a drawback in that the attachment of the wave synthesizer 32 and wave separator 35 to the Er-doped optical fiber 34 and the adjustment thereof is time consuming. Further, the miniaturization of the amplifier as a whole is difficult because a lower limit exists in the winding radius of the long Er-doped optical fiber 34 and an extra length is needed to the portion of the Er doped optical fiber 34 to be connected to the wave synthesizer 32 and wave separator 35.

To overcome the above drawback, there is recently proposed a planar wave guide type optical amplifier including an amplifying core, a core having a function as a wave synthesizer, and a core having a function as a wave separator formed thereto, these cores being made by etching a glass film obtained by doping a rare earth element such as erbium (Er) or the like on a silicon substrate or quartz glass substrate.

Nevertheless, this planar wave guide type optical amplifier has a problem in that since the cores are entirely doped with the rare earth element when manufactured, a signal light and a pumping light are damped by the cores other than the amplifying core so that an amplifying ratio of the planar wave guide type optical amplifier as whole cannot be increased. Further, even if the cores other than the amplifying core are not doped with the rare earth element, the signal light and the pumping light are damped by the rare earth element doped to the portion of the amplifying core other than the amplifying portion thereof and thus an amplifying ratio of the planar wave guide type optical amplifier as a whole cannot be also increased.

SUMMARY OF THE INVENTION

An object of the present invention is to provide a planar wave guide type optical amplifier capable of obtaining a high amplifying ratio, a method of manufacturing the above light amplifier and a device using the light amplifier.

To achieve the above object, there is provided a planar wave guide type optical amplifier which comprises a first core formed to a bar shape on a substrate and a light amplifying region composed of a part of the first core, having a configuration extending to the longitudinal direction of the first core, and doped with a rare earth element.

Further, there is provided a method of manufacturing the planar wave guide type optical amplifier which comprises the steps of (1) forming a bar-shaped core on a plane substrate, (2) forming a groove to the core which extends to the longitudinal direction thereof, (3) filling the groove with a filler doped with a rare earth element, and (4) solidifying the filler.

Further, there provided a laser oscillator which comprises a first core formed to a bar shape on a substrate, a light amplifying portion composed of a part of the first core, having a configuration extending to the longitudinal direction of the first core, and doped with a rare earth element, and light reflecting means provided with the opposite ends of the first core, respectively.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
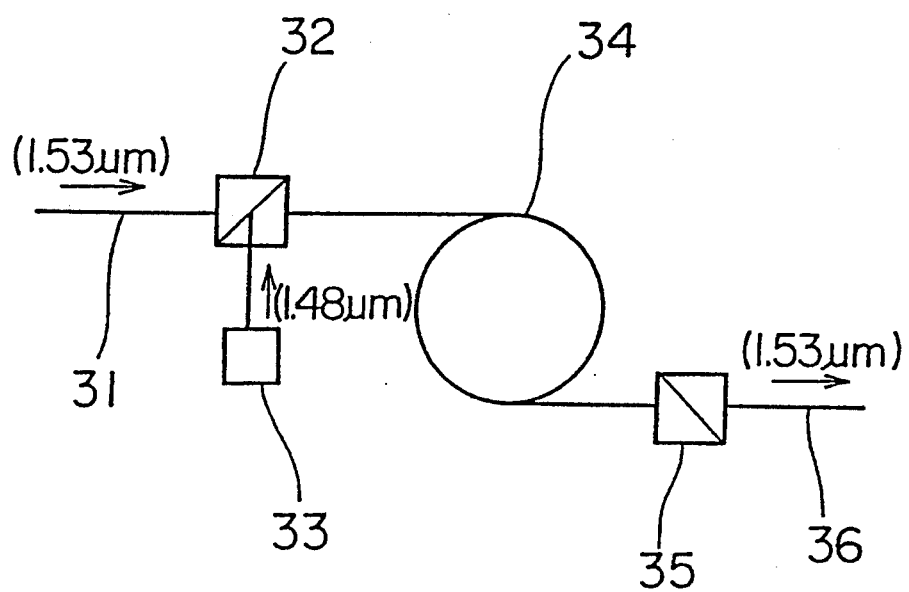
FIG. 1 is a diagram showing the arrangement of a conventional fiber type light amplifier.
Figure 2:
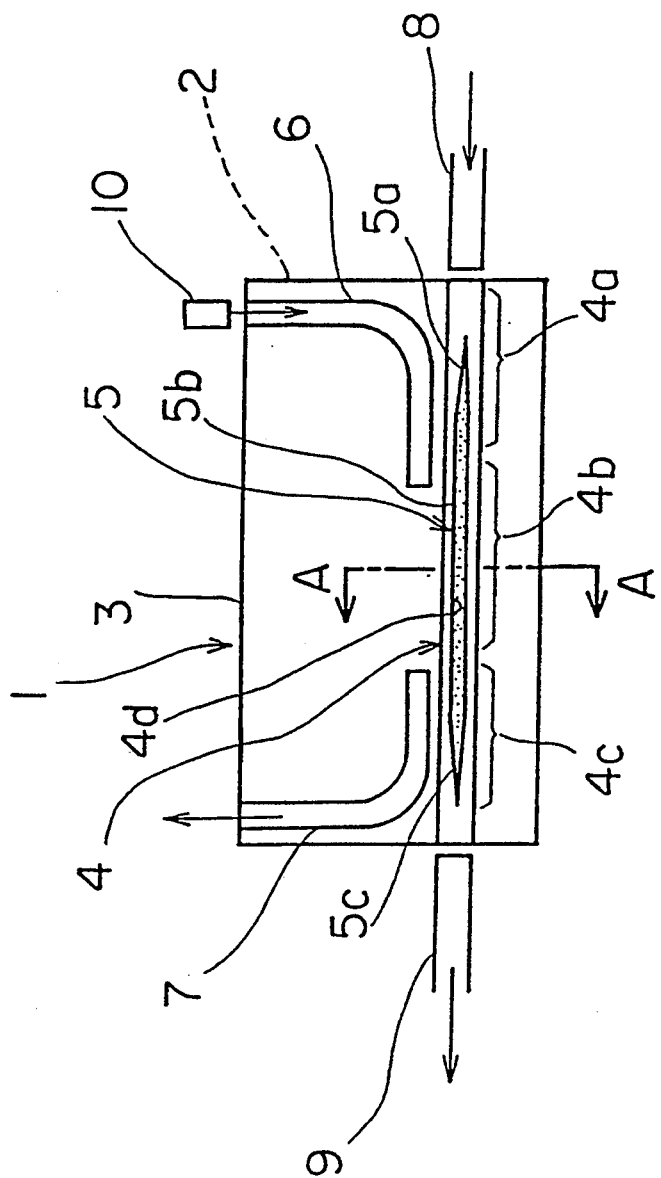
FIG. 2 is a plan view showing the arrangement of a planar wave guide type optical amplifier of the present invention.

FIG. 2 is a plan view showing the arrangement of a planar wave guide type optical amplifier of an embodiment of the present invention. The planar wave guide type optical amplifier 1 has cores 4, 6, 7 each having a thickness of about 7 μm and formed on a silicon substrate 2. Further, a clad 3 is formed therearound. The clad 3 is formed of silicon dioxide ($SiO_2$) to surround the cores 4, 6, 7 as described in detail with reference to FIG. 3. The cores 4, 6, 7 are composed of a quartz glass film mainly doped with germanium dioxide ($GeO_2$) and phosphorus pentoxide ($P_2O_5$).

The core 4 is an amplifying core having an amplifying region 4b formed to the vicinity of the central portion in the longitudinal direction thereof. A light coupling region 4a and light separating region 4c are provided with the opposite ends of the core 4, and an optical fiber 8 for inputting a signal light is connected to the end of the light coupling region 4a and an optical fiber 9 for outputting the signal light is connected to the end of the light separating region 4c, through a lens system, respectively. The lens system is made by forming the end of an optical fiber to a lens shape.

The core 6 is a pumping light introducing core for introducing a pumping light output from a pumping light output unit 10 to the light coupling region 4a of the core 4. A core 7 is a pumping light separating core for introducing the excessive pumping light which has not absorbed by the amplifying region 4b of the core 4 and separated by the light separating region 4c to the outside from the light separating region 4c. More specifically, the cores 6, 7 and the core 4 are disposed so that they keep a predetermined gap G over a predetermined length L to thereby produce the movement of light, i.e., a so-called coupling of light between the cores 6,7 and the core 4. A degree of the coupling is changed depending upon the predetermined length L and predetermined gap G as well as upon a wavelength of a light. Here, a signal light with a wave-length of 1.53 μm is not almost coupled and a pumping light of 1.48 μm is coupled when, for example, L=5 mm, G=1-2 μm.

A groove 4d with a width of about 7 μm in the longitudinal direction thereof and a depth of about 5 μm is formed at the center in the width direction of the core 4 and filled with a glass material 5. The glass material 5 is made by making an alkylsilicate solution doped with erbium (Er) to glass, The groove 4d is linearly formed along the longitudinal direction of the core 4 at the amplifying region 4b thereof and formed to a taper shape at the light coupling region 4a and the light separating region 4c. Therefore, the ends 5a, 5c of the glass material 5 are formed to the taper shape, the central portion 5b of the glass material 5 occupies the vicinity of the axial center of the core 4 in the amplifying region 4b thereof, and the glass material 5 is not sufficiently disposed to the circumferential portion of the core 4.

Figure 3:
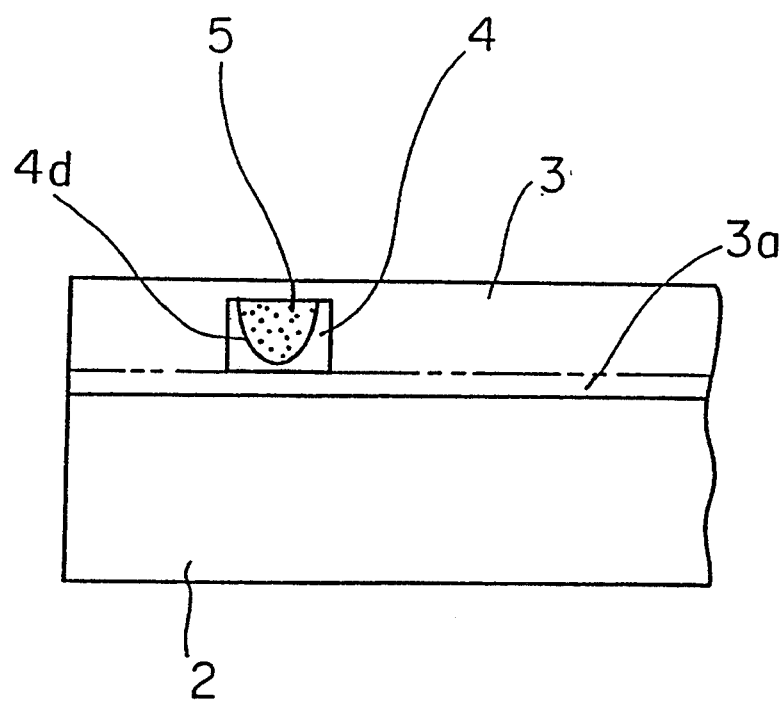
FIG. 3 is a cross sectional view of the planar wave guide type optical amplifier taken along the line A—A of FIG. 2.

FIG. 3 is a cross sectional view of the planar wave guide type optical amplifier taken along the line A—A of FIG. 2. The clad 3 and core 4 are formed on the substrate 2 by a chemical vapor deposition (CVD) method. More specifically, a clad 3a as an underlayer is formed first and the core 4 is formed from the upper side thereof by a flame hydrolysis method and etching. This etching is so-called dry etching effected by ejecting an etching gas toward the portion masked by a resist.

The groove 4d is formed by covering the core 4 with a mask and effecting a wet etching therethrough. More specifically, the mask includes a slender opening with a width of about 7 μm and the opposite ends of the opening in the longitudinal direction thereof is formed to a taper shape. The core 4 is covered with the mask so that the opening is located just above the axis of the core 4 and etching (wet etching) in which liquid such as fluoride acid or the like is used is effected through the mask. With this operation, the groove 4d having a cross section diffusingly etched, as shown in FIG. 3, is obtained.

Thereafter, the alkylsilicate solution doped with erbium (Er) in an amount of 2000 ppm is poured into the groove 4d and dried to powder. Then, the powder is made to glass by being heated at 150° C. for two hours to obtain the glass material 5. Note, the glass material 5 is predoped with germanium dioxide ($GeO_2$) in an amount much greater than that doped to the core 4 in order to increase a degree of light power concentration to the central portion of the core by increasing a refraction factor and also predoped with phosphorus pentoxide ($P_2O_5$) to make the power to glass at a low melting point, in addition to the erbium (Er). The phosphorus pentoxide ($P_2O_5$) also has a little action to increase the refraction factor. Further, the glass material 5 is predoped with aluminium (Al) to increase an amplifying bandwidth.

Thereafter, the clad 3 is further formed to the entire surface of the substrate 2.

Returning to FIG. 2, the operation of the planar wave guide type optical amplifier 1 of the present embodiment having the arrangement as described above will be described. The pumping light of the core 6 is moved to the core 4 at the light coupling region 4a thereof and input to the glass material 5 from the taper-shaped end 5a of the glass material 5. Further, the signal light from the optical fiber 8 is input to the light coupling region 4a of the core 4 and then input from the taper-shaped end 5a of the glass material 5 to the glass material 5. Note, since the end 5a of the glass material 5 is formed to the taper shape, an effective refraction factor obtained by synthesizing the glass material 5 and the core 4 is continuously changed along the longitudinal direction of the core 4. Therefore, the signal light and the pumping light are input to the glass material 5 without almost losing the power thereof.

The signal light and the pumping light input to the glass material 5 passe through the central portion 5b of the glass material 5. At this time, almost all the pumping light is absorbed by the erbium (Er) in the glass material 5, whereas the signal light is amplified by receiving the energy of the pumping light from the erbium (Er). The pumping light remained without being absorbed to the erbium (Er) in the glass material 5 is separated in the light separating region 4c and output to the outside through the core 7 and the amplified signal light is output to the optical fiber 9.

Since the end 5c of the glass material 5 is formed to the taper shape in the same way as the aforesaid end 5a, the signal light passing therethrough has a less amount of loss due to the same reason.

As described above, in the present embodiment, since the groove 4d is formed to the axial center in the vicinity of the amplifying region 4b of the core 4 and the glass material 5 doped with erbium (Er) is formed to the groove 4d, the erbium (Er) can be easily and correctly doped mainly to the portion of the core 4 where an amplifying operation is carried out. With this arrangement, the signal light is not almost absorbed to the portion of the core 4 where the amplifying operation is not almost carried out, a high amplifying ratio can be obtained.

More specifically, a light passing through a core generally has a density represented by a Gaussian distribution at the cross section of the core and the light nearer to the axial center of the core has a higher density. Consequently, amplifying characteristics can be improved when erbium (Er) is doped only to the portion near to the axial center of an amplifying core. When erbium (Er) is doped up to the circumferential portion of a core as in prior art, a signal light is absorbed by the erbium (Er) at the circumferential portion and thus a high amplifying ratio cannot be obtained. When, however, the erbium (Er) is disposed only to the vicinity of the axial center of the core, the amplifying ratio can be improved. The above embodiment is relatively near to the state that erbium (Er) is doped to tile portion near to the axial center of a core.

Further, in the present embodiment, since the ends 5a and 5c of the glass material 5 are formed to the taper shape, the power loss of a signal light and a pumping light can be reduced. According to the experiment performed by the applicants of this application, when a signal light was amplified by using a pumping light with an output of 20 mW and a wavelength of 1.48 μm, an amplifying gain of 20 dB could be obtained.

Further, in the present embodiment, since a refraction factor is increased by increasing the content of $GeO_2$ and $P_2O_5$ in the glass material 5, a degree of light power concentration to the central portion of the core can be increased.

Although erbium (Er) is doped to the glass material 5 in the above embodiment, a rare earth element such as neodymium (Nd), praseodymium (Pr) or the like may be doped.

Further, although the opposite ends 5a and 5c of the glass material 5 are formed to the taper shape in the above embodiment, only one of them may be formed to the taper shape. However, an effect for preventing a power loss is increased when both ends are formed to the taper shape.

Figure 4:
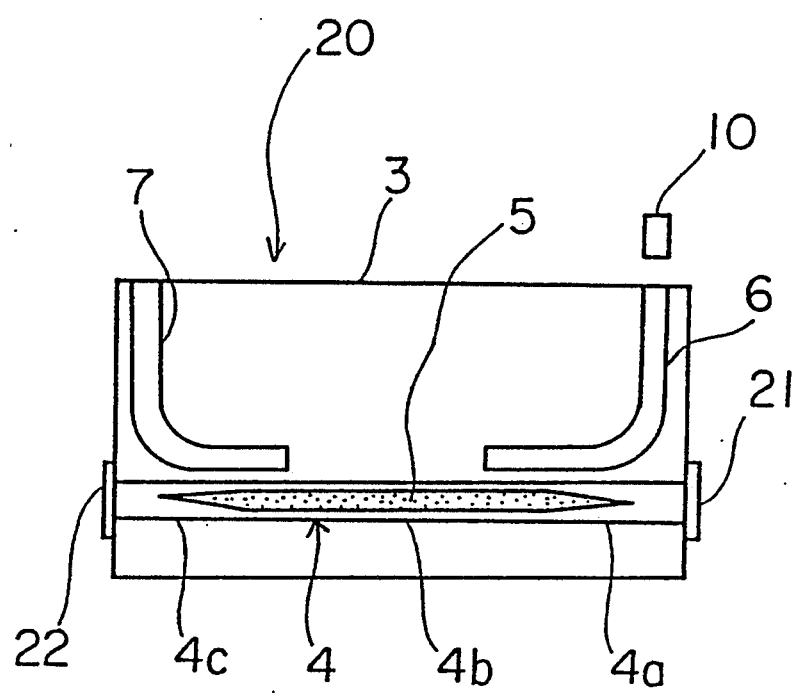
FIG. 4 is a diagram showing the arrangement of a laser oscillator using the planar wave guide type optical amplifier of the present invention.

FIG. 4 is a diagram showing an example in which the planar wave guide type optical amplifier of the present invention is applied to a laser oscillator. Since the laser oscillator 20 has substantially the same basic arrangement as that of the aforesaid planar wave guide type optical amplifier 1, the same numerals as used in the planar wave guide type optical amplifier 1 are used in the laser oscillator 20 to designates the same constituting parts and the description thereof is omitted.

Reflecting films 21, 22 are attached to the opposite ends of a core 4, respectively and the reflecting film 22 has a relatively high transmission ratio.

In the laser oscillator 20, a pumping light with a wavelength of 1.48 μm is input from a core 6 and introduced into the core 4 at the light coupling region 4a thereof. The introduced pumping light is input to a glass material 5 and absorbed to erbium (Er), whereas a light of 1.53 μm is oscillated from the erbium (Er) by a spontaneous induction based on the energy level of the erbium (Er). The pumping light remained without being absorbed to the erbium (Er) is discharged to the outside from a light separating region 4c through a core 7. The oscillated light of 1.53 μm is reflected by the reflecting film 22 and travels in an opposite direction and amplified when it passes through a glass material 5 and further reflected by the reflecting film 21. Thus, the oscillated light of 1.53 μm is gradually amplified while repeating reflection, and when a power reaches a given value (threshold value), it is output from the reflection film 22 side to the outside as a laser beam of 1.53 μm. This laser beam can be used as a light source for an optical communication.

According to the experiment performed by the applicants of this application, when excitation was effected by using a pumping light with an output of 20 mW and a wavelength of 1.48 μm, a laser beam with an output of 15 mW and a wavelength of 1.53 μm could be obtained.

As described above, according to the present invention, since the groove is formed in the vicinity of the amplifying region of the light amplifying core and then filled with the glass material doped with a rare earth element, the rare earth element can be easily and correctly doped only in the vicinity of the amplifying region. With this arrangement, a high amplifying ratio can be obtained.

Further, a laser beam source for an optical communication can be easily obtained by a laser oscillator using the thus obtained planar wave guide type optical amplifier and further a small laser oscillator can be provided at a low price.

The forgoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A planar wave guide type optical amplifier for amplifying a light signal, comprising:
    a first core formed to a bar shape on a substrate; and
    a light amplifying region composed of a part of said first core, having a configuration extending to the longitudinal direction of said first core, and doped with a rare earth element;
    said amplifying region having a taper-shaped configuration at least on one of the ends in the longitudinal direction thereof.

2. A planar wave guide type optical amplifier according to claim 1, further comprising:
    a second core formed on said substrate for introducing a pumping light to said first core; and
    a third core formed on said substrate for separating the pumping light from said first core.

3. A method of manufacturing a planar wave guide type optical amplifier, comprising the steps of:
    (1) forming a bar-shaped core on a plane substrate;
    (2) forming a groove to said core which extends to the longitudinal direction thereof;
    (3) filling said groove with a filler doped with a rare earth element; and
    solidifying said filler.

4. A method of manufacturing a planar wave guide type optical amplifier according to claim 3, wherein said filler is composed of an alkylsilicate solution.

5. A method of manufacturing a planar wave guide type optical amplifier according to claim 4, wherein said alkylsilicate solution is heated and made to glass at said step (4).

6. A method of manufacturing a planar wave guide type optical amplifier according to claim 3, wherein said groove is provided with a taper-shaped configuration at at least one of the ends in the longitudinal direction thereof at said step (2).

7. A method of manufacturing a planar wave guide type optical amplifier according to claim 3, wherein said groove is formed by etching at said step (2).

8. A method of manufacturing a planar wave guide type optical amplifier according to claim 3, wherein said step (2) comprising:
    a step (2a) in which said core is covered with a mask having a slender opening provided with a taper-shaped configuration at at least one of the ends in the longitudinal direction thereof; and
    a step (2b) in which wet etching is effected to said core through said mask.

9. A laser oscillator using a planar wave guide type optical amplifier, comprising:
    a first core formed to a bar shape on a substrate;
    a light amplifying region composed of a part of said first core, having a configuration extending to the longitudinal direction of said first core, and doped with a rare earth element;

said amplifying region having a taper-shaped configuration at least one end of the ends in the longitudinal direction thereof; and light reflecting means provided with the opposite ends of said first core, respectively.

10. A laser oscillator according to claim 9, further comprising:

a second core formed on said substrate for introducing a pumping light to said first core;

a third core formed on said substrate for separating the pumping light from said first core.

11. A laser oscillator according to claim 10, wherein said first core has a means for outputting a laser beam having a wavelength different from that of the pumping light introduced from said second core.

* * * * *

UNITED STATES PATENT AND TRADEMARK OFFICE
CERTIFICATE OF CORRECTION

PATENT NO. : 5,381,262
DATED : January 10, 1995
INVENTOR(S) : Tadao Arima

It is certified that error appears in the above-identified patent and that said Letters Patent is hereby corrected as shown below:

Col. 1, line 23, "," should be --.--.

Col. 3, line 28, "," should be --.--.

Col. 4, line 67, "tile" should be --the--.

Signed and Sealed this

Twenty-eight Day of March, 1995

Attest:

BRUCE LEHMAN

Attesting Officer     Commissioner of Patents and Trademarks